July 5, 1960     H. D. PARKS     2,943,505
COMBINED SINUSOIDAL DRIVE MECHANISM
Filed April 11, 1957     2 Sheets-Sheet 1

INVENTOR
HERMAN D. PARKS
BY
Brumbaugh, Free, Graves & Donohue
HIS ATTORNEYS

July 5, 1960 H. D. PARKS 2,943,505
COMBINED SINUSOIDAL DRIVE MECHANISM
Filed April 11, 1957 2 Sheets-Sheet 2
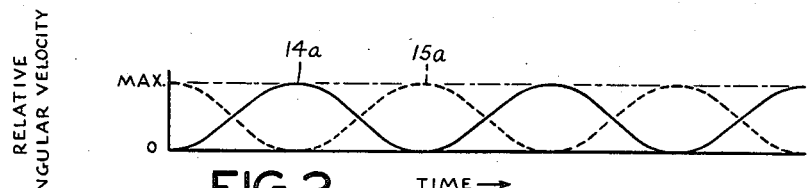
FIG.2.
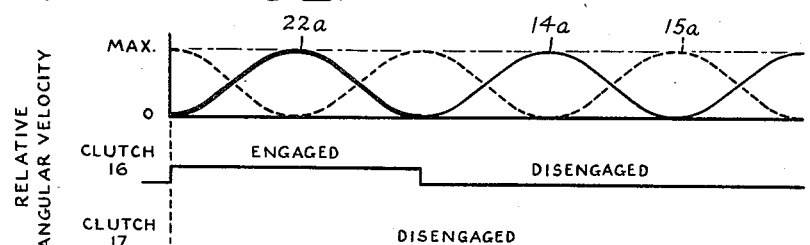
FIG.4a. ONE-POSITION MOTION
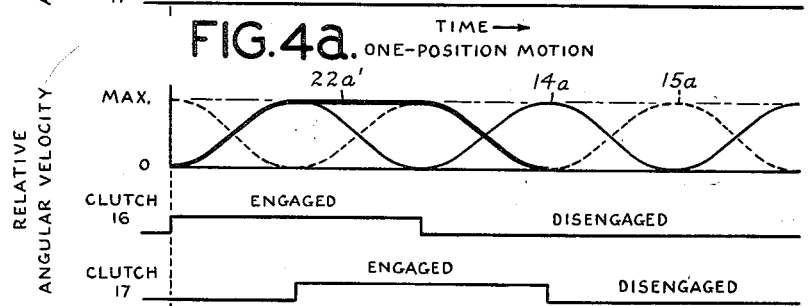
FIG.4b. TWO-POSITION MOTION
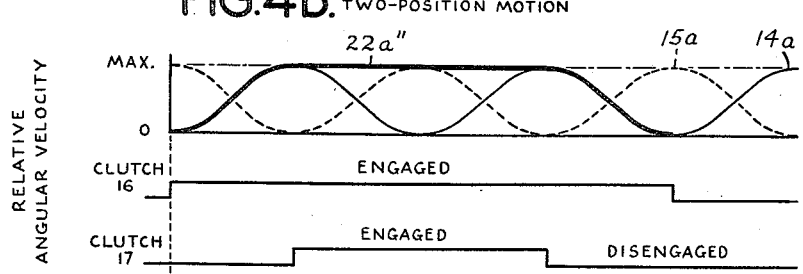
FIG.4c. THREE-POSITION MOTION
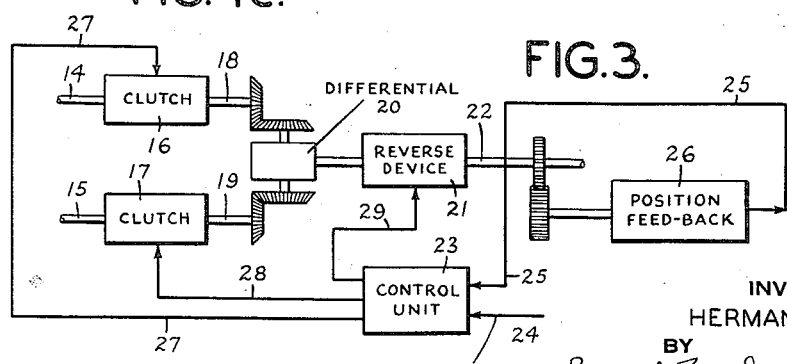
FIG.3.
INVENTOR
HERMAN D. PARKS
BY
Brumbaugh, Free, Graves & Donohue
HIS ATTORNEYS

United States Patent Office 2,943,505
Patented July 5, 1960

2,943,505

COMBINED SINUSOIDAL DRIVE MECHANISM

Herman D. Parks, Norwalk, Conn., assignor to Time, Incorporated, New York, N.Y., a corporation of New York Filed Apr. 11, 1957, Ser. No. 652,175

9 Claims. (Cl. 74—394)

This invention relates to drive mechanisms and, more particularly, to a mechanism adapted to drive a load from any one to any other of a series of discrete positions with sinusoidal acceleration and deceleration.

In the design of various forms of drive mechanisms, it is well known that the most efficient manner of starting and stopping the motion of a load is by imparting a sinusoidally varying velocity to the load. Although many devices for accomplishing this have been proposed, none is readily adaptable to apparatus wherein the load must be positoned precisely at any of a series of uniformly spaced locations.

Accordingly, it is an object of this invention to provide a new and improved device for accelerating and decelerating a load with a sinusoidally varying velocity.

Another object of the invention is to provide apparatus of the above character for moving a load from any one to any other of a series of uniformly spaced positions with maximum efficiency.

Still another object of the invention is to provide a new and improved device for generating rotary motion having a velocity varying in a substantially sinusoidal manner.

These and other objects of the invention are attained by connecting two sine generators, each producing motion having a velocity varying from zero to a maximum value and having equal amplitude and frequency, to a drive shaft through a differential mechanism, the generators being arranged in a 180° out-of-phase relation. A clutch interposed between each generator and the differential is capable of engaging and disengaging only at the position of zero velocity of its generator shaft. The two generators may be permanently linked in the proper phase relationship by connecting them to the same constant velocity source of rotational motion. Each of the generators may utilize an eccentrically mounted planet gear adapted to revolve within an internal gear having twice its pitch diameter. Another gear eccentrically supported on the planet gear transmits motion having the desired velocity characteristics to an output shaft through an intermediate oscillating gear.

Further objects and advantages of the invention will be apparent from a reading of the following description taken in conjunction with the accompanying drawings in which:

Fig. 2 is a graphical representation showing the variation in angular velocity of each of the sine generators;

Fig. 3 is a schematic diagram illustrating a typical control system adapted for use with the drive mechanism of Fig. 1;

Figs. 4a, 4b and 4c are graphical illustrations showing the velocity of the output shaft for various conditions of clutch actuation;

Figure 1:
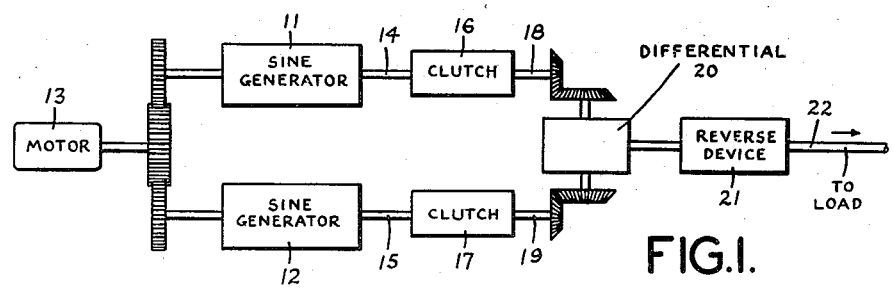
Fig. 1 is a block diagram illustrating a typical drive mechanism arranged according to the invention.

The apparatus shown in Fig. 1 comprises a pair of sine generators 11 and 12 driven by a motor 13 and connected thereto so as to produce angular motions having zero to maximum sinusoidally varying velocity with the same amplitude, direction, and frequency and opposite phase at the shafts 14 and 15 as represented by the graphs 14a and 15a respectively in Fig. 2. In order to combine these motions, the shafts 14 and 15 are connected through a pair of clutches 16 and 17 to two shafts 18 and 19 respectively which comprise the input to a conventional differential mechanism 20, the output of the differential being connected through a reversing device 21 to a load shaft 22. Each of the clutches 16 and 17 is of a known type such, for example, as the devices described in U.S. Patents No. 331,524, granted December 1, 1885, and No. 413,490, granted October 22, 1889, and is arranged to engage or disengage the shaft 18 or 19 only at the position of zero velocity of its generator shaft 14 or 15.

A typical system for controlling the drive mechanism is shown in Fig. 3 wherein a control unit 23 compares in the usual manner an information signal 24, representing the position to which the load is to be driven, with another signal 25 derived from a conventional position sensing device 26 and representing the present location of the load. In response to the difference between these signals, the control unit actuates the clutches 16 and 17 and the reverse device 21 through the lines 27, 28, and 29, respectively, for example, to drive the load to the desired position. As an example, the position sensing device 26 may comprise a potentiometer having its movable tap driven by the load to generate a voltage signal representing the position of the load, while the control unit 23 may include a voltage comparer, such as a conventional vacuum tube circuit, which energizes both the lines 27 and 28 as long as the potential difference between its input signals 24 and 25 indicates that the load is more than a predetermined distance away from the desired position. Furthermore, the control unit 23 may include, for example, a diode-actuated relay to energize the line 29 whenever the difference between the position signals 24 and 25 is in one direction and deenergize this line when the difference is in the other direction, thus operating the reverse device 21 to drive the load in the proper direction. In order to obviate the necessity for accurate synchronization of the clutch operation, the clutches 16 and 17 may be of the type which can be conditioned by energization or deenergization of an actuating solenoid through the lines 27 and 28, respectively, at any time to engage or disengage at the next occurrence of zero velocity of its generator shaft. Inasmuch as the clutches 16 and 17, the control unit 23 and the positioning device 26 are all conventional equipment and may comprise any of a number of devices well known in the art, they are not illustrated in detail in the drawings.

In operation, the output shaft 22 drives the load to the desired location with sinusoidal acceleration and deceleration as shown by way of example in the graphs of Figs. 4a, 4b, and 4c. In this illustration, the lines 22a, 22a' and 22a" represent the velocity of the load shaft for one position, two-position and three-position motions, respectively. It will be noted that this velocity is equal to the sum of the shaft velocities 14a and 15a when both the clutches 16 and 17 are engaged, the velocity being constant during the engagement of both clutches because of the identical amplitudes and frequencies and out-of-phase relation of the two generators 11 and 12.

When only one clutch is engaged, the velocity of the shaft 22 increases or decreases in a sinusoidal manner. Thus, for instance, in Fig. 4c, the output velocity represented by the line 22a" increases from zero to maximum with the shaft 14 when the clutch 16 connects the shafts 14 and 18. If the clutch 17 has been conditioned during the last velocity cycle of the shaft 15 to engage, it will connect the shafts 15 and 19 at this point, the velocity of the shaft 15 being zero. Thus, the two sinusoidally varying velocities 14a and 15a are added to impart a constant velocity 22a" to the shaft 22.

When the load has reached a predetermined position, which may be between one and two increments distant from the desired location, signals from the control unit 23 condition the clutches 16 and 17 to disengage. When each of the generator shafts 14 and 15 reaches its next position of zero velocity, it is disconnected by the conditioned clutch, the positions of zero velocity being synchronized to correspond to the series of discrete locations to which the load may be driven. In the example illustrated in Fig. 4c, the clutch 17 operates first to disconnect the shafts 15 and 19, decelerating the load to zero velocity through the shaft 18 and positioning it at the desired location. At this time, the clutch 16 is deactivated and the load remains in this position at zero velocity, no motion being transmitted to the differential 20.

It will be apparent that a load may be moved through any number of positions in this manner and that several such mechanisms may be combined to impart sinusoidally varying velocities of different amplitudes or different directions simultaneously to facilitate the prompt completion of the load-moving operation.

Figure 5:
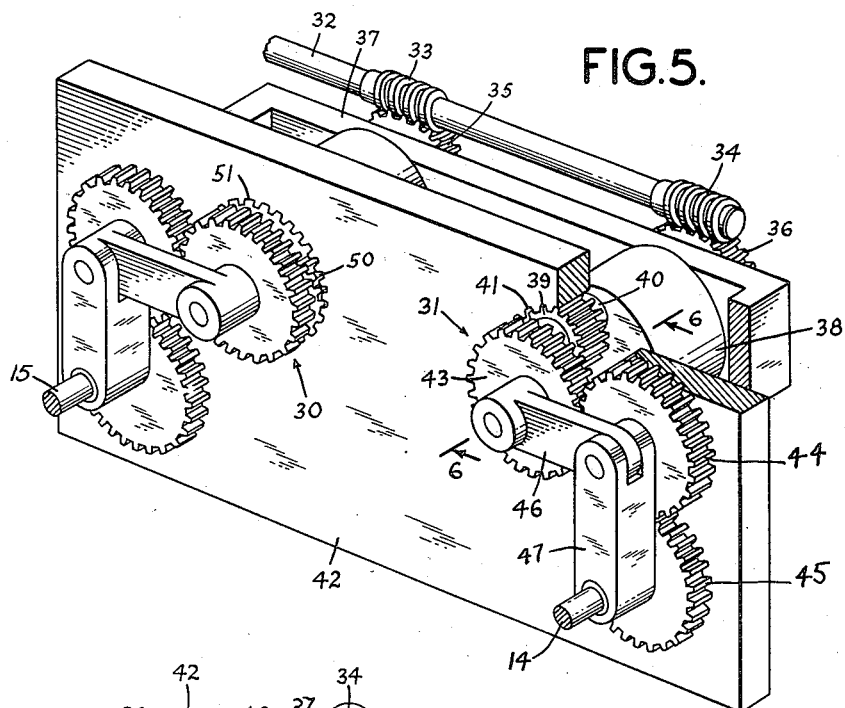
Fig. 5 is a perspective view, partly in section, illustrating apparatus designed to produce two motions of substantially sinusoidal velocity variation having opposite phase relation.
Figure 6:
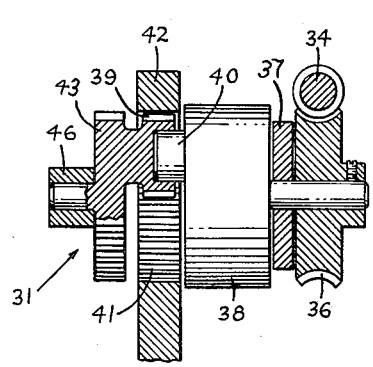
Fig. 6 is a partial sectional view taken along the lines 6—6 of Fig. 5 and looking in the direction of the arrows.

In a preferred embodiment of the invention, the sinusoidal motions imparted to the shafts 14 and 15 may be approximated by the apparatus illustrated in Figs. 5 and 6. In this arrangement, two sine generators 30 and 31 are driven from a common input shaft 32 through two worms 33 and 34 driving two worm wheels 35 and 36, respectively. Secured to the wheel 36 and rotatably supported in a vertical plate 37 is a shaft 38 carrying a gear 39 rotatably mounted on an eccentric stud 40. The gear 39 meshes with and revolves within an internal gear 41 having twice its pitch diameter which, in the illustrated embodiment, is formed in another vertical support plate 42. On the other side of the plate 42 a gear 43 is rigidly attached in an eccentric manner to the gear 39, also having twice its pitch diameter and with its axis coincident with the pitch line of the gear 39.

An intermediate gear 44 meshes with the gear 43 and with an output gear 45 and is free to oscillate therebetween, its center being freely supported between the centers of the gears 43 and 45 by two links 46 and 47, respectively, thereby converting the epicyclic motion of the gear 43 to a rotary motion at the gear 45. This motion varies from zero to a maximum velocity in an approximately sinusoidal manner, the deviation from a pure sine function resulting from the departure of the centers of the gears 43, 44, and 45 from a straight line, and may be applied to a clutch and differential in the desired manner to the shaft 14, which is fixed in position in the plate 42.

The generator 30, constructed in a similar way, produces a rotary motion at the other output shaft 15, also fixed in position in the plate 42, having the same amplitude and frequency but opposite phase, its eccentric gear 50 being meshed with an internal gear 51 at a position diametrically opposite to that of the gear 39. Thus, two out-of-phase motions varying in velocity in a substantially sinusoidal manner are derived from the constant velocity motion of the shaft 32.

Although the invention has been described with reference to a specific embodiment, many variations and modifications thereof will occur to those skilled in the art. Accordingly, the scope of the invention is not intended to be restricted except as defined by the following claims.

I claim:
1. Apparatus for driving a load from one position to another comprising at least two variable velocity motion generators each adapted to produce rotary motion varying from zero to a maximum velocity in an out-of-phase relation selected so that the sum of their velocities is a substantially constant value, means for adding the two motions, and clutch means interposed between at least one of the generators and the adding means.

2. Apparatus according to claim 1 wherein the clutch means is adapted to connect and disconnect the generator from the adding means when the generator motion is at zero velocity.

3. Apparatus according to claim 1 including means for reversing the direction of rotation of the output motion from the adding means.

4. Apparatus for driving a load from one position to another comprising a source of constant velocity rotation, a pair of variable velocity motion generators connected thereto each adapted to produce continuous rotary motion varying from zero to a maximum velocity in 180° out-of-phase relation to the other, differential means for adding the two rotary motions, and clutch means interposed between each of the generators and the differential means.

5. Apparatus according to claim 4 wherein the generators each produce a rotary motion varying in velocity in a substantially sinusoidal manner and having the same frequency and maximum amplitude.

6. Apparatus according to claim 4 wherein each of the clutch means is adapted to connect and disconnect its generator from the differential means when the generator motion is at zero velocity.

7. Apparatus according to claim 6 wherein each of the clutches is adapted to be actuated while its generator shaft is in motion, the actuation taking effect at the next position of zero velocity of the generator.

8. Apparatus according to claim 6 including sensing means for determining the position of the load and control means responsive to the sensing means for actuating the clutch means.

9. Apparatus according to claim 8 including means for reversing the direction of rotation of the output motion from the differential means, said reversing means being actuated by the control means.

References Cited in the file of this patent

UNITED STATES PATENTS

| | | |
|---|---|---|
| 1,178,923 | Johns | Apr. 11, 1916 |
| 1,742,918 | Loomis | Jan. 7, 1930 |
| 1,759,472 | Tutte | May 20, 1930 |
| 2,493,418 | Orshansky | Jan. 3, 1950 |
| 2,547,453 | Egy | Apr. 3, 1951 |
| 2,628,024 | Greenwood | Feb. 10, 1953 |